United States Patent
Sheu

[11] Patent Number: 6,160,939
[45] Date of Patent: Dec. 12, 2000

[54] OPTICAL CABLE HAVING A FILLING MATERIAL WITH STABLE VISCOSITY AND YIELD STRESS

[75] Inventor: Jim Jenqtsong Sheu, Dunwoody, Ga.

[73] Assignee: Lucent Technologies Inc., Murray Hill, N.J.

[21] Appl. No.: 09/282,604

[22] Filed: Mar. 31, 1999

[51] Int. Cl.[7] ........................................... G02B 6/44
[52] U.S. Cl. ..................... 385/109; 385/100; 385/113; 523/173; 428/375
[58] Field of Search .............................. 385/100–114, 109, 385/113; 428/375; 523/173; 508/136; 525/194; 106/272; 522/42; 510/304, 338

[56] References Cited

U.S. PATENT DOCUMENTS

| | | | |
|---|---|---|---|
| 4,265,775 | 5/1981 | Aakalu et al. | 252/573 |
| 4,551,569 | 11/1985 | Verne | 585/6.6 |
| 4,701,016 | 10/1987 | Gartside, III et al. | 350/96.23 |
| 4,709,982 | 12/1987 | Corne et al. | 350/96.23 |
| 4,798,853 | 1/1989 | Handlin, Jr. | 523/173 |
| 4,810,395 | 3/1989 | Levy et al. | 252/28 |
| 5,187,763 | 2/1993 | Tu | 385/100 |
| 5,358,664 | 10/1994 | Brauer | 252/315.4 |
| 5,737,469 | 4/1998 | Costello et al. | 385/109 |

FOREIGN PATENT DOCUMENTS 2046471  3/1980  United Kingdom.

Primary Examiner—Phan T. H. Palmer
Attorney, Agent, or Firm—Michael A. Morra

[57] ABSTRACT

An optical cable [100] having one or more optical fibers [11] that are surrounded by an improved filling material [10] is disclosed. The filling material includes one or more synthetic oil(s) that are present in an amount, which is 80 to 95 percent by weight of the filling material and which have an average molecular weight that is greater than about 350. The filling material further includes an organic gelling agent, which is a diblock copolymer that is present in an amount of about 5 to 20 percent by weight. However, no more than 1.5 percent by weight of inorganic gelling agents may be used without impairing the long-term stability of the viscosity and the yield stress of the filling material. Preferably, a blend of two different polyalphaolefin oils are used while inorganic gel ling agents are completely avoided. Critical-yield stress is kept appropriately low (i.e., less than 0.01 psi) by the use of diblock copolymers. Together, these factors cooperate to provide a filling material whose yield stress and viscosity have excellent stability over time.

18 Claims, 2 Drawing Sheets

OPTICAL CABLE HAVING A FILLING MATERIAL WITH STABLE VISCOSITY AND YIELD STRESS

TECHNICAL FIELD

This invention relates to an optical cable that includes one or more optical fibers surrounded by an improved water-blocking filling material.

BACKGROUND OF THE INVENTION

Optical cables include a core having one or more optical fibers within a sheath system, which surrounds and protects the fibers. In the cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level within the cable, especially if a plastic jacket is the only barrier to the ingress of the moisture. Water may also enter the cable because of rodent attacks or mechanical impacts that cause openings in the sheath system. And while the presence of water within an optical cable is not necessarily detrimental to its performance, passage of the water along the cable interior to connection points or terminals or associated equipment inside closures, for example, may cause problems especially in freezing environments and should be prevented. Therefore, it should be no surprise that cables for transmitting communications signals must meet industry standards with respect to waterblocking provisions. For example, one industry standard requires that there be no transmission of water under a pressure head of one meter in one hour through a one-meter length of cable.

In the prior art, various techniques have been used to prevent the ingress of water through the sheath system of a cable and along the core. For example, metallic shields have been used that require a longitudinal seam to be watertight. However, forming a shield around the cable core requires relatively low manufacturing line speeds, and destroy the otherwise all-dielectric property of an optical cable. Moreover, lightning strikes are known to create holes in such a metallic shield, thereby damaging its integrity as a water barrier.

Various gel-like materials have also been used to fill cable cores to prevent the ingress of water with varying degrees of success. And while the use of such materials cause housekeeping problems for field personnel during splicing operations, they continue to be used in optical cable cores because they effectively block the entry of water and maintain the optical fibers in a low-stress state. These materials generally comprise a thickening or gelling agent in a liquid carrier. The gelling agents used are typically fatty acid soaps, but other agents, such as clays, silica, organic dyes, aromatic amides, and urea derivatives are also used. Non-soap thickeners are typically present as relatively isometric colloidal particles. Gelling agents form a network structure in which the liquid carrier is held by capillary forces. When a low stress is applied to a gel-like composition, the material acts substantially as a solid. If the stress is above a critical value, then the material flows and viscosity decreases rapidly. (Materials having such characteristics are called "thixotropic.") This decrease in viscosity is largely reversible because it is typically caused by the rupture of network junctions between the filler particles, and these junctions can reform following the release of the critical stress.

A cable filling material, especially an optical fiber cable filling material, should meet a variety of requirements. Among them is the requirement that the physical properties of the cable remain within acceptable limits over a wide temperature range, for example, from about −40° C. to about 80° C., and the filling material should not drip out of the cable at temperatures as high as 80° C. It is also desirable that the filling material be substantially free of syneresis, which is to say that it should have uniform consistency over a predetermined temperature range. Generally, syneresis is controlled by assuring dispersion of an adequate amount of colloidal particles or other gelling agent. Another desirable property of the filling material is thermal oxidation resistance.

Filling materials for use in optical fiber cables should yield under strains that are experienced when the cable is made or handled. Otherwise, movement of the optical fibers within the cable would be prevented and the fibers would buckle because they contact a surface of the unyielding filling material. Filling materials should also have a relatively low shear modulus, $G_e$. However, it has been determined that, at least for some applications, a low value of $G_e$ of the filling material is not sufficient to assure low cabling loss, and that a further parameter, the critical-yield stress, $\sigma_c$, needs to be controlled because it also affects performance. It has been found that cabling loss is kept suitably low when $\sigma_c$ is less than about 0.01 psi (i.e., 70 Pa).

A filling material that exhibits relatively low critical-yield stress is disclosed in U.S. Pat. No. 4,701,016 that issued on Oct. 20, 1987. This filling material comprises oil, a gelling agent such as fumed silica particles and, optionally, a bleed inhibitor. Fumed silica particles are used as inorganic thickening agents to adjust the yield stress of the composition, and cause the oil to gel by bonding surface hydroxyl groups to form a network. Such gels are capable of supporting a load below a critical value of stress. Above this stress level, the network is disrupted, and the material assumes a liquid-like character and flows under stress.

Filling materials for use in cables also must pass industry-standard drip tests. To pass these tests, the filling materials must be retained as cable samples, suspended vertically, are subjected to specified elevated temperatures. Some prior art materials perform satisfactorily with respect to microbending and associated losses, but they bleed out excessively and have problems in meeting current drip tests. Also, it is desired that the low mean added losses exhibited by some prior art filling materials at least be met by filling materials which pass the drip test and have suitable low temperature properties.

Oil separation is a property of a filling material that describes its tendency to bleed oil during its lifetime. Desirably, a filling material which has an oil separation no greater than 2 percent when centrifuged at relative centrifugal forces of 27,000 g at 25±2° C. for two hours. Because cable drip is related to oil separation, constraints on the sought-after filling material include oil separation, critical-yield stress and viscosity. These constraints are antagonistic to each other. For example, a reduction of oil separation and an increase in cable drip temperature require high viscosity and high yield stress; whereas low viscosity and low yield stress are required to facilitate processing and to reduce optical loss.

Another filling material having a relatively low critical-yield stress is shown in U.S. Pat. No. 5,187,763 that issued on Feb. 16, 1993. The disclosed composition comprises synthetic oil, an inorganic gelling agent (fumed silica), and a bleed inhibitor. Because of the type of gel-forming agents used in the prior art, the network structures formed in the filling materials are not rigid and can be broken and reformed either at the same sites to restore the old structures or at new sites thereby form different structures. The disruptions and reformation of networks are the major reason that these gel-like filling materials display unstable viscosities and cause some difficulties in measuring them. Most critically, such network structures also continue to form resulting in a continuously increasing gel viscosity and/or critical-yield stress to an undesirable level. Obviously, the gel-like filling materials will have lost, over time, most of their desired properties that the prior art had originally intended.

What is sought after and what does not appear to be disclosed in the prior art is an optical fiber cable filling composition of matter which is compatible with a broad range of optical fiber coating materials, which does not bleed, which does not drip from the cable core at specified elevated temperatures, and which has a relatively low critical-yield stress. Importantly, what is also sought after is an optical fiber cable filling composition of matter which has a stable network structure that retains all properties, particularly viscosity, over its lifetime

SUMMARY OF THE INVENTION

The foregoing problems of the prior art have been solved by an optical cable having one or more optical fibers that are surrounded by an improved filling material. The filling material includes synthetic oil(s) that are present in an amount, which is 80 to 95 percent by weight of the filling material and which have an average molecular weight that is greater than about 350. The filling material further includes a thickening system that comprises a diblock copolymer that is present in an amount that is 5 to 20 percent by weight. However, no more than about 1.5 percent by weight of inorganic gelling agents may be used without impairing the long-term stability of the viscosity of the filling material.

A significant aspect of the invention is the recognition (i) that inorganic gelling agents detrimentally affect the long-term stability of the viscosity of the filling material; and (ii) that synthetic oils, preferably polyalphaolefin and blends thereof, have better viscosity performance at low-temperatures than non-synthetic oils. Together, these factors cooperate to provide a filling material whose yield stress and viscosity have excellent stability over time.

In preferred embodiments of the invention, a blend of two different polyalphaolefin oils are used, and inorganic gelling agents are completely avoided. Critical-yield stress is kept appropriately low by the use of diblock copolymers to cause gelling. Polymers containing large amounts of diblock structure are referred to as low coupled. The diblock structure causes the polymer to be softer, lower in viscosity, and lower in cohesive strength. These are desirable properties for optical cable filling materials.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
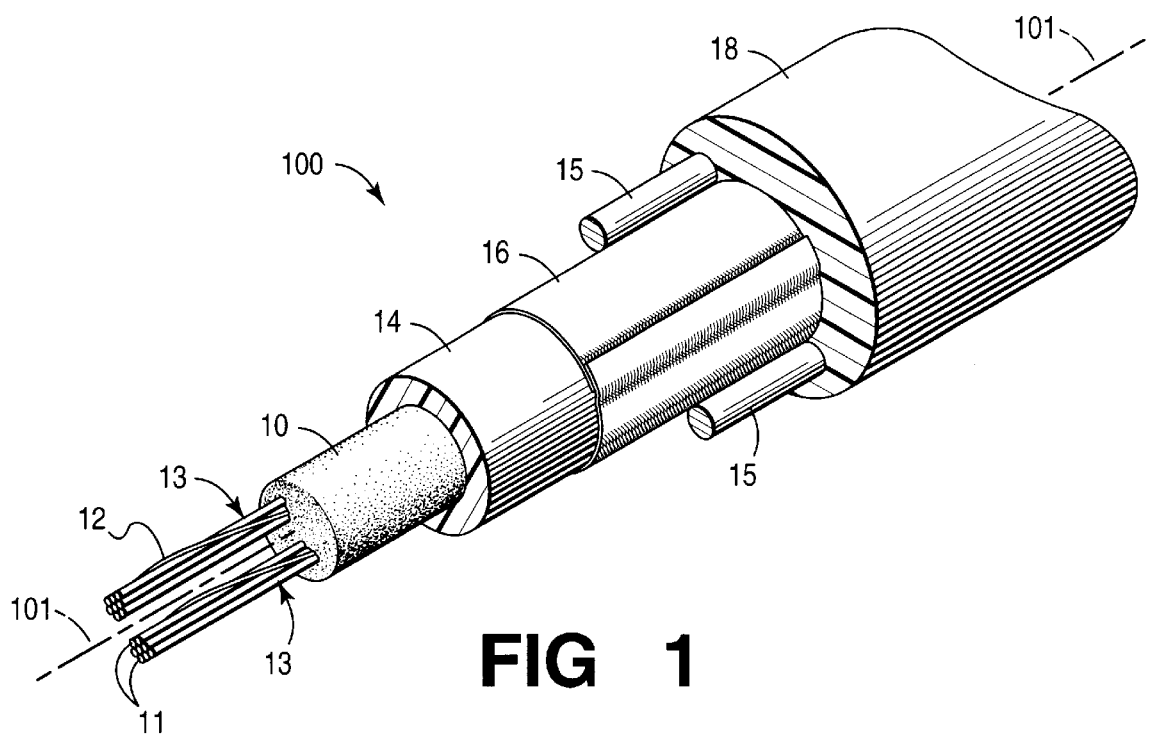
FIG. 1 is a perspective view of an optical cable that includes a filling material in accordance with the invention.
Figure 2:
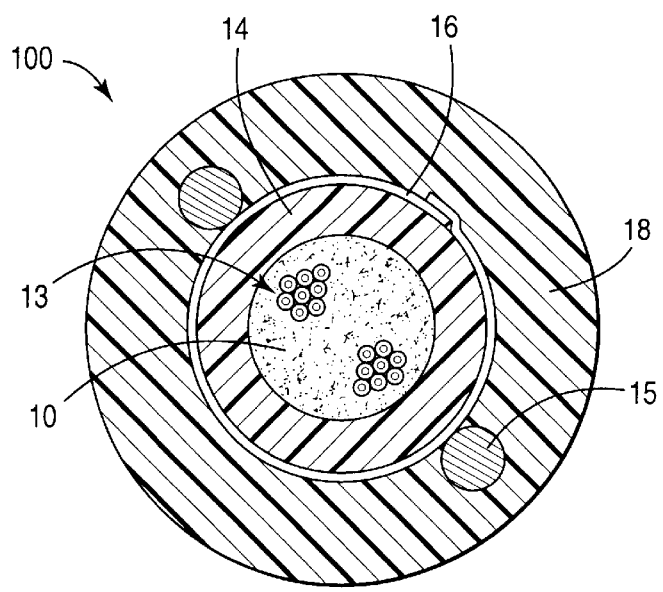
FIG. 2 is an end view in section of the cable of FIG. 1.

Referring now to FIGS. 1 and 2, there is shown an optical cable which is designated generally by the numeral 100 and which has a longitudinal axis 101. It includes a core comprising optical fibers 11 which may be arranged in one or more units 13—13. Each of the optical fibers is provided with a protective coating system which typically includes an inner primary coating layer and an outer secondary coating layer. Also, each of the coated fibers may be buffered with an outer layer of polyvinyl chloride (PVC), for example. Each of the units 13 is shown wrapped with a yarn binder 12, although the units 13 may comprise planar arrays (ribbons) of optical fiber as disclosed in U.S. Pat. No. 4,900,176. The core includes a waterblocking material 10 which is disposed within a tubular member 14, which is frequently referred to as a core tube.

A sheath system surrounds the core tube 14 and, illustratively, includes waterblocking tape 16, longitudinally extending strength members 15—15, and jacket 18. The strength member preferably comprise rigid dielectric rods that, alternatively, could be made from steel. Moreover, the strength members 15—15 could even be replaced by a strength system having little or no compressive stiffness in comparison to its tensile stiffness since the main purpose of any strength system is to preclude tensile loads, which are applied to the cable jacket 18 from reaching the optical fibers 11. Waterblocking tape 16 illustratively includes superabsorbent materials.

The desired filling material 10 includes constraints, inter alia, on oil separation, drip temperature, critical-yield stress and Helipath viscosity. As already mentioned, these constraints are generally antagonistic to each other. Heretofore, it has been demonstrated that low pour point oils produce filling materials the critical-yield stress of which at low temperatures decreases with decreasing pour point. The pour point of a material is the lowest temperature at which a sample of the material may be poured. Theoretically, the use of a low pour point oil is conducive to the reduction of optical loss at low temperatures. Cable construction and cable processing conditions also affect the optical performance of fibers and, therefore, the benefit of a low pour point oil may become obscured.

The critical-yield stress of a filling material is considered to affect the optical performance of fibers in a cable filled with the filling material. The prior art filling material typically has a critical-yield stress of about 0.002 psi at room temperature and about 0.0096 psi at −40° C. The critical-yield stress of the filling material IO should be such that it does not cause an increase in optical fiber loss over that of prior art filling materials at all temperatures.

Figure 4:
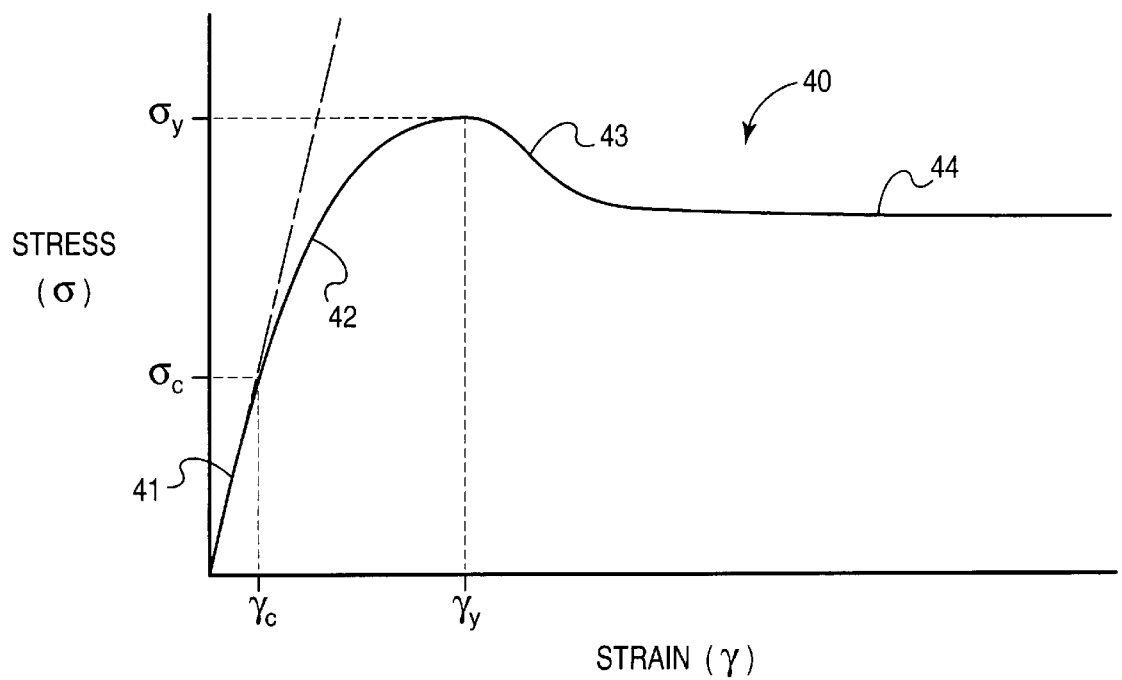
FIG. 4 illustrates a generalized stress-strain curve of a thixotropic filling material.

FIG. 4 shows a generalized stress-strain curve 40 at constant strain rate for a thixotropic material such as that used as the waterblocking material 10, and identifies several important parameters. Along a segment 41 of the stress-strain curve 40, the material acts essentially as an elastic solid. The segment extends from zero stress to the critical-yield stress $\sigma_c$. The strain corresponding to $\sigma_c$ is identified as $\gamma_c$, the critical-shear strain. By definition, the coordinates $\sigma_c$ and $\gamma_c$ indicate the onset of yielding, and the quantity $\sigma_c/\gamma_c$ (i.e., $d\sigma/d\gamma$ for $\gamma<\gamma_c$) is known as the shear modulus, $G_e$, of the material.

A segment 42 of the stress-strain curve of FIG. 4 represents increasing values of incremental strain for increasing stress. The stress $\sigma_y$ is the maximum value of stress sustainable by the material at a given strain rate with $\gamma_y$ being the corresponding strain. For strains in excess of $\sigma_y$, the stress at first decreases as shown by a segment 43, becoming substantially independent of strain for still greater values of strain as shown by a segment 44.

The waterblocking material thus exhibits a liquid-like behavior for $\sigma > \sigma_y$.

Because the filling materials of the present invention are thixotropic, care must be taken in making viscosity measurements to assure accuracy. Because many known viscometers measure viscosity by shearing the same material over and over, they do not provide accurate results for thixotropic materials because chemical bonds are broken by the measurement. However, a Helipath viscometer such as the RV Series viscometer, which is commercially available from Brookfield Engineering Laboratories, Inc., causes a vertical spindle having horizontal crossbar to cut a helical path through the material to be measured. Accordingly, the crossbar is always interacting with a "new" supply of filling material whose chemical bonds are still intact. Note that it may take several days of inactivity for the chemical bonds to reform before another accurate measurement can be taken.

It is desired that the viscosity of the filling material be approximately equal to existing filling materials so that presently available processing facilities can be used. Accordingly, based on existing processing techniques and desired operational performance, the viscosity of a suitable filling material is preferably between 15 and 45 units as measured at room temperature using the above-mentioned Helipath viscometer with its Tb spindle. Helipath viscometer data is presented in terms of "units" of viscosity. To convert these units into centipoise (cps), multiplication by 8000 is necessary when the Tb spindle, which has a crossbar length of 1.435 inches, is operated at 0.5 RPM. In order to assure an appropriate waterhead resistance for the optical fiber cable, the Helipath viscosity should be in excess of 20 units.

Figure 3:
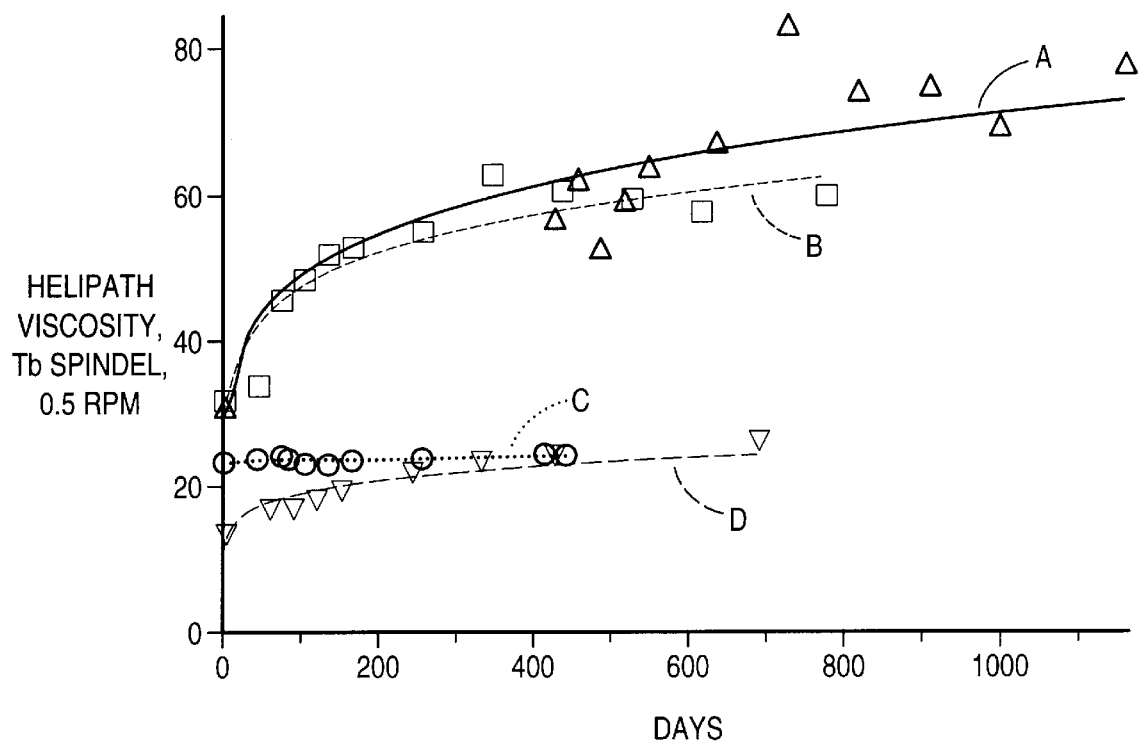
FIG. 3 is a graph showing the time variation of Helipath viscosity for selected filling materials.

However, regardless of the particular viscosity value of the filling material used, it is most desirable to have a filling material with a stable viscosity over time. As shown in FIG. 3, the compositions of the filling materials in accordance with the present invention notably do not have any significant increase of viscosity over time, whereas all known filling materials display a substantial viscosity increase over time. Such stability is attributable to a network structure, which once established stays substantially intact. At least one reason that most existing filling materials do not have a stable network structure is their use of significant amounts of inorganic gelling agents, i.e., greater than about 2 percent by weight of the filling material. The presence of these inorganic constituents contributes to the chemical network structures of such filling material compositions continually being broken down and reformed either at the same sites to restore the old structures or at new sites thereby forming different chemical network structures.

The disruptions and reformations of network structures result in unstable viscosity values for the materials. More specifically, when the new and different network structures continue to form over time, the filling material will exhibit a continuously increasing viscosity value as is shown in FIG. 3. In fact, the viscosity values could eventually rise to a level where the filling a material becomes ineffective for its desired use within a communications cable. It is also important to note that as the viscosity of a filling material increases, the critical-yield stress of that filling material also increases.

In general, the present invention involves providing a composition of a filling material which exhibits a stable or non-varying Helipath viscosity over a long period of time, i.e., greater than at least one year. More specifically, the composition disclosed and claimed herein utilizes a thickening system with an increased amount of organic gelling agent relative to existing filling materials while significantly decreasing, preferably eliminating, all inorganic constituents within the thickening system.

In accordance with one embodiment of the present invention, the composition of filling material 10 includes one or more synthetic oils that comprise 80–95 percent by weight of the filling material. The average molecular weight of these synthetic oils is greater than about 350. The synthetic oil may, for example, comprise a polyalphaolefin oil, a polyglycol oil, a polybutene oil, a polyisobutylene oil, a polypropene oil, a silicone oil, or mixtures thereof. In order to preserve desirable low temperature properties of the filling material, only a small amount, preferably zero, of natural oils such as mineral oil, may be used. In a preferred embodiment, the composition includes about 87% by weight of a polyalphaolefin such as HITEC 174 oil available from the Ethyl Corporation or SHF 401 oil available from the Mobil Corporation. The synthetic oil of the preferred embodiment is a hydrogenated oligomer of alpha-decene and has an average molecular weight of 1280. The viscosity of the oil at 100° C. is approximately 40 centistokes, and it has a pour point of less than −34° C.

The oil constituent needs to be thickened so that it will not run out of a cable and so that oil separation is reduced. Oil separation or syneresis is a property of a gel-like filling material which describes the tendency to bleed oil during the lifetime of the filling material. One prior art filling material is known to separate oil if left undisturbed for a certain period of time. The syneresis is usually a slow process and, therefore, has to be determined by an accelerated method, centrifugation. As mentioned above, the filling material desirably has an oil separation, which is less than 2 percent when centrifuged at a relative centrifugal force of 27,000 g at 25±2° C. for two hours.

In order to accomplish these desired objectives, known filling materials have generally required that both inorganic and organic thickening agents be included in the composition of the filling material. Often, colloidal fillers are used as the inorganic thickening agents to adjust the yield stress of the composition. However, the presence of inorganic constituents in the thickening system leads to an undesired amount of disruptions and reformations of the chemical network structures of the filling material that adversely affect the long term stability of the viscosity of the filling material.

Oil retention of the filling material 10 may be improved by the addition of one of more organic thickening agents or bleed inhibitors to the composition. Copolymers used as bleed inhibitors are known to reduce the oil separation of a gel-like filling material, and, unlike fumed silica, does not contribute as much to increasing yield stress and viscosity. The preferred concentration of the organic gelling agent(s) and/or bleed inhibitor(s) for the current invention is at or above about 7 percent by weight of the filling material.

In one embodiment of the present invention, the organic gelling agent may be a block copolymer, a relatively high viscosity semiliquid, sometimes referred to as semisolid, rubber, or other appropriate rubber. Block copolymers and semiliquid rubbers may be referred to collectively as rubber polymers. Incorporating a rubber polymer into the gel-like composition of matter allows a reduction in the amount of colloidal particles that must be added to the mixture to prevent syneresis of the gel and can result in cost savings. Furthermore, it makes possible the formulation of non-bleeding compositions having a relatively low critical-yield stress.

Among the block copolymers that can be used in water-blocking compositions of the invention are styrene-rubber and styrene-rubber-styrene block copolymers having a styrene/rubber ratio between approximately 0.1 and 0.8 and a molecular weight, as indicated by viscosity in toluene at 25° C., of from about 100 centipoise (cps) in a 20 percent by weight rubber solution to about 2000 cps in a 15 percent by weight rubber solution. Exemplary diblock copolymers include: (a) a styrene-ethylene propylene block copolymer (SEP), unplasticized, having a styrene/rubber ratio of about 0.59, a specific gravity of about 0.93, a break strength per ASTM D-412 of 300 psi, and being available from the Shell Chemical Company of Houston, Tex., under the trade designation Kraton G 1701; (b) a styrene-ethylene propylene block copolymer having a sytrene to rubber ratio of about 0.39 and available from the Shell Chemical Company under the designation G1702; and (c) a diblock copolymer of ethylene and propylene UP) available from the Shell Chemical Company under the designation G1750. Another copolymer which may be used is Kraton 1726 copolymer, which is a mixture of 30% styrene-ethylene butylene-styrene triblock copolymer (SEBS) and 70% styrene-ethylene butylene diblock copolymer (SEB). A preferred embodiment uses Kraton G1701 block copolymer.

Also included in the composition of the filling material 10 is an antioxidant system in the amount of about 1–2 percent by weight. The antioxidant constituents are high molecular weight, hindered phenolic antioxidants which are relatively soluble in mineral oil. An acceptable antioxidant is one available from the Ciba-Geigy Company under the trade designation Irganox 1035. In a preferred embodiment, the fitting composition includes 0.3% by weight of Irganox 1035 antioxidant and 1.7 percent by weight of Irganox 1076 antioxidant, the latter constituent being used to prevent the antioxidant from settling out. Alternatively, 2 percent by weight of Irganox 1076 may be used. The solubility of Irganox 1035 antioxidant in mineral oil is about 0.30 g/100 ml and that of Irganox 1076 is 12 g/100 ml at 22° C. Another suitable non-precipitating antioxidant is Irganox 1520 high molecular weight liquid antioxidant, also available from the Ciba-Geigy Company.

The composition of the filling material 10 unexpectedly results in excellent properties. It would be expected that in order to increase the drip temperature, the yield stress and the viscosity would have to be increased, perhaps to unacceptable levels. Unexpectedly, the filling material used in the cable of the present invention provides excellent results notwithstanding its relatively low viscosity.

Exemplary compositions of this invention are shown in the table below, with the constituents being given in percent by weight. A summary of properties also is presented in the table. Included in the table are measurements of Helipath viscosity, oil separation and critical-yield stress at room temperature. Cable drip test results at 80 or 85° C. are also provided.

FILLING MATERIALS

| | Composition (wt %) | | | | Antioxidant System | | Helipath Viscosity | Oil | Yield Stress @ | Pass | Pass |
|---|---|---|---|---|---|---|---|---|---|---|---|
| | Hydrocarbon | | | Copolymer | | | | | | | |
| | SHF 82 | SHF 402 | SHF 101 | Kraton G1701 | Irganox 1035 | Irganox 1076 | 3 +/− 1 days (Tb Unit) | Separation (%) | 20° C. (psi) | Drip Test at 80° C. | Drip Test at 85° C. |
| A | 69 | 19.5 | | 9.7 | 0.2 | 1.6 | 23.2 | 0 | 0.0011 | Yes | Yes |
| B | 69 | 20.5 | | 8.7 | 0.2 | 1.6 | 16.7 | 0 | <0.0011 | Yes | Yes |
| C | 69 | 21.5 | | 7.7 | 0.2 | 1.6 | 19.0 (Ta) | 0 | <0.0011 | Yes | Yes |
| D | 69 | 18.7 | | 10.5 | 0.2 | 1.6 | 31.8 | 0 | 0.0016 | Yes | Yes |
| E | | | 90 | 8.7 | 0.2 | 1.6 | 22 | 0 | 0.0011 | Yes | Yes |
| F | | | 91 | 7.7 | 0.2 | 1.6 | 14.5 | 0 | <0.0011 | Yes | Yes |
| G | | | 88 | 10.5 | 0.2 | 1.6 | 40.4 | 0 | 0.0021 | Yes | Yes |
| H | | | 89 | 9.7 | 0.2 | 1.6 | 31.4 | 0 | 0.0016 | Yes | Yes |
| I | 68.7 | 21.5 | | 8 | 0.2 | 1.6 | 10.5 | 0 | <0.0011 | Yes | Yes |
| J | | | 90 | 8 | 0.2 | 1.6 | 16.4 | 0 | <0.0011 | Yes | Yes |

It should be observed that in at least one embodiment of the present invention, the level of the antioxidant constituent is relatively high. This provides a reservoir of antioxidant, which increases the oxidative stability of the tubular member 14 and optical fiber coatings to prevent premature degradation of the optical fiber cable.

The filling material 10 of this invention has enhanced performance at low temperature because of the use of a low pour point oil, has a relatively high cable drip temperature and very low oil separation. The filling material 10 is compatible with presently used fiber coating materials and other cable materials which it contacts. There is no bleeding of oil and it is expected that the optical loss at −40° C. will not exceed that of the prior art filling materials.

It is to be understood that the above-described arrangements are simply illustrative of the invention. Other arrangements may be devised by those skilled in the art that embody the principles of the invention and fall within the scope thereof For example: (i) small amounts of one or more triblock copolymers may be combined with the diblock copolymer(s) of the present invention to gel the synthetic oil; and (ii) small amounts of one or more natural oils may be combined with the synthetic oil(s) of the present invention. Moreover, the optical cable of the present invention may comprise ribbon fibers and/or groups of individual fibers without binders.

What is claimed is:

1. An optical cable, said optical fiber cable having a core that includes at least one optical fiber disposed within a core tube, a sheath system that surrounds the core tube, and a filling material that is disposed within the core tube, said filling material comprising:
   (a) 80 to 95 percent by weight of synthetic oil(s) selected from the group consisting of polyalphaolefins, polyglycols, polybutenes, polyisobutylenes, polypropenes, silicone oils, and blends of said synthetic oils, said oils having an average molecular weight that is greater than about 350;
   (b) 5 to 20 percent by weight of a diblock copolymer(s); and
   (c) less than 1.5 percent by weight of an inorganic gelling agent(s).

2. The optical cable of claim 1 wherein the synthetic oil(s) comprise polyalphaolefin oil(s).

3. The optical cable of claim 1 further including about 2 percent by weight of antioxidants.

4. The optical cable of claim 3 wherein the antioxidant comprises a high molecular weight, hindered phenolic antioxidant.

5. The optical cable of claim 1 wherein the diblock copolymer constitutes more than about 7 percent by weight of the filling material.

6. The optical cable of claim 1 wherein the filling material exhibits less than about a 50 percent variance in Helipath viscosity over a time period greater than about 100 days.

7. The optical cable of claim 1 wherein the filling material exhibits less than about a 25 percent variance in Helipath viscosity over a time period greater than about 200 days.

8. The optical cable of claim 1 wherein the filling material exhibits less than about a 15 percent variance in Helipath viscosity over a time period greater than about 300 days.

9. The optical cable of claim 1 wherein the filling material exhibits less than about a 5 percent variance in Helipath viscosity over a time period greater than about 400 days.

10. The optical cable of claim 1 wherein the diblock copolymer comprises a polystyrene block and a poly (ethylene-propylene) block having a styrene-rubber ratio in the range of about 0.1 to 0.8.

11. The optical cable of claim 1 wherein the diblock copolymer comprises a linear copolymer comprising a styrene-ethylene-butylene-styrene block.

12. The optical cable of claim 1 wherein the diblock copolymer comprises a multi-arm copolymer comprising a poly (ethylene-propylene) block.

13. The optical cable of claim 1 wherein the core tube is disposed along a central axis of the cable.

14. An optical cable comprising:
   a core comprising at least one optical fiber transmission medium;
   a sheath system which is disposed about said core; and
   a filling material which is disposed in said core, said filling material having a critical-yield stress that is less than about 0.01 psi (70 Pa) and exhibiting less than about a 50 percent variance in Helipath viscosity over a time period greater than about 100 days.

15. The optical cable of claim 14 wherein inorganic gelling agents constitute less than about 1.5 percent by weight of the filling material.

16. The optical cable of claim 14 wherein diblock copolymers constitute at least 7 percent by weight of the filling material.

17. The optical cable of claim 14 wherein synthetic oil(s) constitute at least 80 percent by weight of the filling material.

18. The optical cable of claim 17 wherein the synthetic oil(s) comprise polyalphaolefin oil(s).

* * * * *